United States Patent
Voruganti et al.

(10) Patent No.: US 8,144,584 B1
(45) Date of Patent: Mar. 27, 2012

(54) WRR SCHEDULER CONFIGURATION FOR OPTIMIZED LATENCY, BUFFER UTILIZATION

(75) Inventors: Sreenivas Voruganti, Bangalore (IN); Ankur Singla, San Jose, CA (US); Pal Ashish, New Delhi (IN); Balaji Murali, Bangalore (IN); Vedamurthy A. Joshi, Bangalore (IN)

(73) Assignee: Juniper Networks, Inc., Sunnyvale, CA (US)

( * ) Notice: Subject to any disclaimer, the term of this patent is extended or adjusted under 35 U.S.C. 154(b) by 251 days.

(21) Appl. No.: 12/505,992

(22) Filed: Jul. 20, 2009

(51) Int. Cl.
*G01R 31/08* (2006.01)

(52) U.S. Cl. ............... 370/232; 370/395.41; 370/412

(58) Field of Classification Search .............. 370/398, 370/395.4, 395.41, 232, 235, 412
See application file for complete search history.

(56) References Cited

U.S. PATENT DOCUMENTS

| | | | |
|---|---|---|---|
| 6,434,155 B1 * | 8/2002 | Jones et al. ............... 370/398 |
| 6,754,215 B1 * | 6/2004 | Arikawa et al. .......... 370/395.4 |
| 6,891,835 B2 * | 5/2005 | Kalkunte et al. ........ 370/395.41 |
| 6,917,590 B1 * | 7/2005 | Oliva ........................ 370/232 |
| 6,975,630 B1 * | 12/2005 | Kusumoto ............... 370/395.41 |
| 7,106,745 B2 * | 9/2006 | Kusumoto ............... 370/395.41 |
| 7,110,359 B1 * | 9/2006 | Acharya ................... 370/235 |
| 7,277,446 B1 * | 10/2007 | Abi-Nassif et al. ........ 370/412 |
| 7,289,515 B2 * | 10/2007 | Kusumoto ............... 370/395.41 |

FOREIGN PATENT DOCUMENTS

EP 1111851 A2 * 6/2001

* cited by examiner

*Primary Examiner* — Ayaz Sheikh
*Assistant Examiner* — Mounir Moutaouakil
(74) *Attorney, Agent, or Firm* — Harrity & Harrity, LLP

(57) ABSTRACT

A method includes receiving network information for calculating weighted round-robin (WRR) weights, calculating WRR weights associated with queues based on the network information, and determining whether a highest common factor (HCF) exists in relation to the calculated WRR weights. The method further includes reducing the calculated WRR weights in accordance with the HCF, when it is determined that the HCF exists, and performing a WRR scheduling of packets, stored in the queues, based on the reduced WRR weights.

12 Claims, 7 Drawing Sheets

WRR SCHEDULER CONFIGURATION FOR OPTIMIZED LATENCY, BUFFER UTILIZATION

BACKGROUND

In a network device, a scheduler is commonly used to schedule the processing of data units (e.g. packets, cells, frames, etc.) associated with multiple traffic flows. Typically, a weighted round-robin (WRR) scheduler may process data units according to WRR weights associated with queues. Each WRR weight may indicate a level of priority, in which the larger the WRR weight, the higher the priority. For example, consider three queues, namely, queue 0, queue 1, and queue 2, which are assigned respective WRR weights of 10, 20, and 30. Given this configuration, the WRR scheduler services queue 0 for 10 timeslots, and queue 1 may have to wait those 10 timeslots before the WRR scheduler services queue 1. Additionally, queue 2 may have to wait 30 timeslots (i.e., 10 timeslots for queue 0 and 20 timeslots for queue 1) before the WRR scheduler services queue 2. As a result, the WRR scheduler may cause periods of burstiness to the traffic flow associated with, for example, queue 2, which may increase the amount of buffering and/or may cause a higher latency to occur with respect to queue 0 and/or queue 1.

SUMMARY

According to one implementation, a method may include receiving, by a network device, network information for calculating weighted round-robin (WRR) weights; calculating, by the network device, WRR weights associated with queues based on the network information; and determining, by the network device, whether a highest common factor (HCF) exists in relation to the WRR weights. The method may further include reducing, by the network device, the WRR weights in accordance with the HCF, when it is determined that the HCF exists; and performing, by the network device, a WRR scheduling of packets stored in the queues based on the reduced WRR weights.

According to another implementation, a network device may include a WRR weight calculator to calculate weighted round-robin (WRR) weights based on at least one of available bandwidth or type of network traffic, determine whether a highest common factor exists in relation to the WRR weights, reduce the WRR weights in accordance with the HCF when it is determined that the HCF exists, and store the reduced WRR weights. The network device may further include a WRR scheduler to schedule the processing of packets stored in queues based on the reduced WRR weights.

According to yet another implementation, a network device may include means for calculating weighted round-robin (WRR) weights, means for determining whether a highest common factor (HCF) exists in relation to the WRR weights, and means for reducing the WRR weights in accordance with the HCF, when it is determined that the HCF exists. The network device may further include means for storing the reduced WRR weights, and means for scheduling the processing of packets, associated with queues, based on the stored WRR weights.

BRIEF DESCRIPTION OF THE DRAWINGS

The accompanying drawings, which are incorporated in and constitute a part of this specification, illustrate one or more implementations described herein and, together with the description, explain these implementations. In the drawings.

DETAILED DESCRIPTION

The following detailed description refers to the accompanying drawings. The same reference numbers in different drawings may identify the same or similar elements. Also, the following description does not limit the invention.

The term "packet," as used herein, may refer to a packet, a datagram, a frame, or a cell; a fragment of a packet, a fragment of a datagram, a fragment of a frame, a fragment of a cell; or another type, arrangement, or packaging of data.

Implementations described herein may include methods, devices, and/or systems that provide a WRR scheduling scheme that spreads the scheduling of timeslots more evenly than existing approaches. In one implementation, a lowest weight for all queues may be calculated, which maintains a weighted proportionality between the queues.

In one exemplary implementation, the lowest weight may be determined by dividing WRR weights with a highest common factor (HCF). If a HCF cannot be obtained because of the values of the WRR weights, ratios between WRR weights may be modified. For example, each of the WRR weights may be divided by a value of N (e.g., an approximate HCF). The selection of the value of N may be calculated based on a balance between, for example, optimization and tolerance to potential errors in the ratios. For example, in one implementation, the value of N may be selected based on an error range, where the error associated with the ratios between WRR weights may fall between a particular error range. In another implementation, the value of N may be selected based on an error threshold, where the error associated with the ratios between WRR weights may not exceed a particular error threshold.

Figure 1:
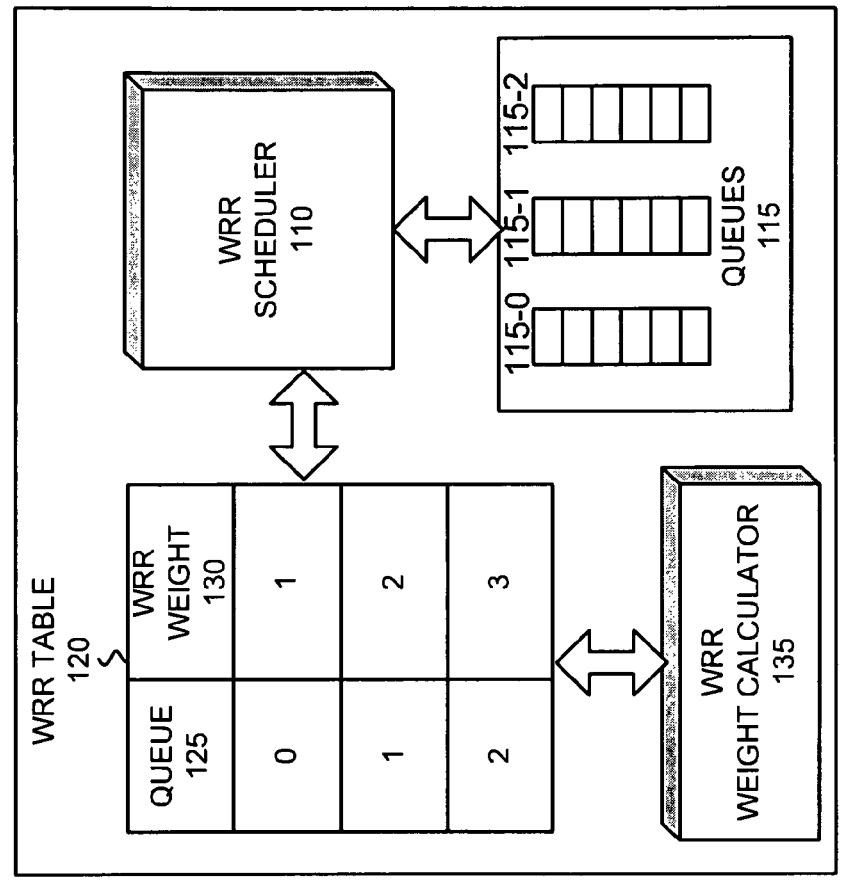
FIG. 1 is a diagram illustrating an overview of exemplary implementations described herein.

FIG. 1 is a diagram illustrating an overview of exemplary implementations described herein. As illustrated, a network device 105 may include a WRR scheduler 110, queues 115-0, 115-1, and 115-2 (referred to generally as queues 115 or queue 115), a WRR table 120, and a WRR weight calculator 135.

Network device 105 may include a device having the capability to communicate with other devices, systems, networks, and/or the like. For example, network device 105 may correspond to a router, a switch, a network device that provides layer 2 and/or layer 3 functionality, or some other type of communication device that may process and/or forward network traffic (e.g., packets).

WRR scheduler 110 may schedule the processing (e.g., forwarding decisions, transmit decisions, receive decisions, etc.) of packets in queues 115 in a WRR fashion. WRR scheduler 110 may process the packets in queues 115 based on WRR table 120. Queues 115 may store packets for processing.

WRR table 120 may correspond to a data structure (e.g., a table) that identifies a particular queue (e.g., 115-0, 115-1, 115-2) and its corresponding WRR weight. For example, WRR table 120 may include a queue field 125, which may indicate or identify a particular queue, and a WRR weight field 130, which may indicate a particular WRR weight. WRR scheduler 110 may process each queue 115 based on queue's 115 corresponding WRR weight indicated in WRR weight field 130.

WRR weight calculator 135 may calculate the WRR weights indicated in WRR weight field 130. In an exemplary case, assume the same set of parameters exist with respect to the calculation of WRR weights 10, 20, and 30. However, in contrast to WRR weights 10, 20, and 30, WRR weight calculator 135 may calculate WRR weights of 1, 2, and 3, for queues 0, 1, and 2. In one implementation, WRR weight calculator 135 may calculate these WRR weights based on determining a HCF among the WRR weights. For example, assume WRR weight calculator 135 calculates WRR weights of 10, 20 and 30. WRR weight calculator 135 may determine that the HCF of 10, 20, and 30 is 10. In such an instance, WRR weight calculator 135 may utilize the determined HCF to reduce the WRR weights to 1, 2, and 3. WRR weight calculator 135 may store the WRR weights of 1, 2, and 3, corresponding to queues 0, 1, and 2, in WRR weight field 130 of WRR table 120. Thus, as illustrated in WRR table 120, queue 0, queue 1, and queue 2 may have corresponding WRR weight values of 1, 2, and 3. WRR scheduler 110 may process packets associated with queues 115 based on the WRR weights stored in WRR table 120.

As a result of the foregoing, the proportionality of the WRR weights with respect to queues 115 may be preserved. However, WRR scheduler 110 may not cause periods of burstiness to the traffic flow associated with, for example, queue 2, and an increase in the amount of buffering and/or latency, with respect to queues 0 and 1, may not occur. Since the implementations have been broadly described, variations exist. For example, WRR weight calculator 135 may calculate WRR weights when a HCF does not exist. Accordingly, a detailed description of the implementations is provided below.

Although FIG. 1 illustrates an exemplary network device 105, in other implementations, network device 105 may include fewer, different, or additional components, or a different arrangement of components than illustrated and described with respect to FIG. 1.

Exemplary Network Device Architecture

Figure 2:
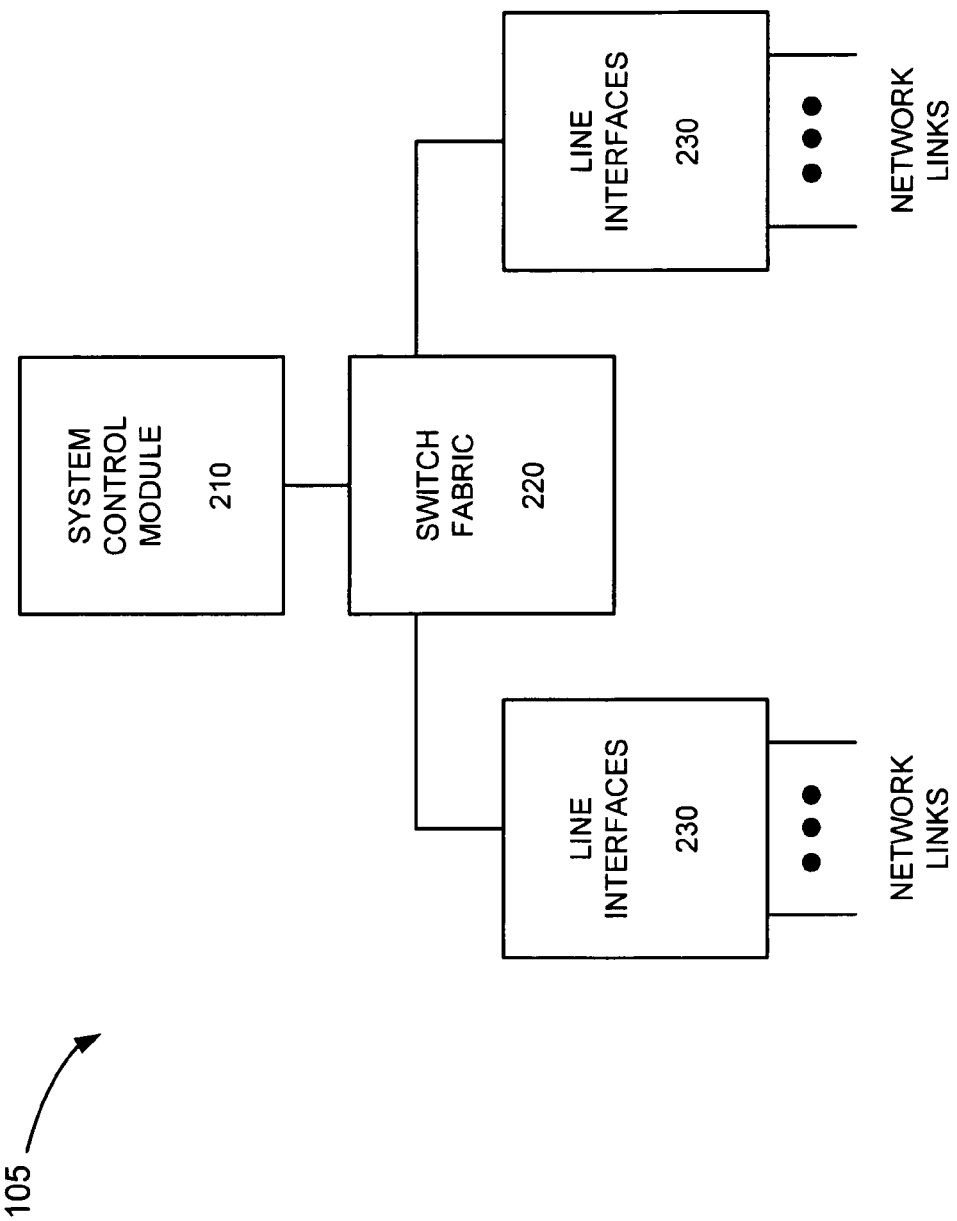
FIG. 2 is a diagram illustrating exemplary components of a network device depicted in FIG. 1.

FIG. 2 is a diagram illustrating exemplary components of network device 105. As illustrated in FIG. 2, network device 105 may include, for example, a system control module 210, a switch fabric 220, and a group of line interfaces 230.

System control module 210 may include one or multiple processors, microprocessors, application specific integrated circuits (ASICs), field programming gate arrays (FPGAs), and/or processing logic that may be optimized for networking and communications. System control module 210 may perform high level management functions for network device 105. For example, system control module 210 may communicate with other networks, devices, and/or systems connected to network device 105 to exchange information regarding network topology. In some implementations, system control module 210 may include a routing engine for creating routing tables based on network topology information, creating forwarding tables based on the routing tables, and sending these tables to interfaces 230 for data unit routing. System control module 210 may also include a static memory (e.g. a read only memory (ROM)), a dynamic memory (e.g. a random access memory (RAM)), onboard cache, and/or flash memory for storing data and/or machine-readable instructions.

Switch fabric 220 may include one or multiple switching planes to facilitate communication among interfaces 230 and/or system control module 210. In one implementation, each of the switching planes may include a single-stage switch or a multi-stage switch of crossbar elements. Switch fabric 220 may also, or alternatively, include processors, memories, and/or paths that permit communication among system control module 210 and interfaces 230.

Line interfaces 230 may include devices or assemblies, such as line cards, for receiving incoming packets from network links (or from other line interfaces 230) and for transmitting the packets to network links (or to other line interfaces 230). For example, line interfaces 230 may include wireless and/or wireless interfaces, such as, Ethernet interfaces, optical carrier (OC) interfaces, and/or asynchronous transfer mode (ATM) interfaces. Line interfaces 230 may manage a set of input ports via which packets can be received and a set of output ports via which packets can be transmitted. Line interfaces 230 may include memory, one or more processors, and/or other logic.

Depending on the implementation, the components that are illustrated in FIG. 2 may provide fewer or additional functionalities. For example, if network device 105 performs an Internet Protocol (IP) data unit routing function as part of a Multiprotocol Label Switching (MPLS) router, system control module 210 may perform tasks associated with obtaining routing information from other routers in a MPLS network. In such cases, conveying network traffic from one interface to another may involve label-based routing, rather than IP address-based routing.

Network device 105 may perform operations and/or processes related to routing and/or switching. According to an exemplary implementation, network device 105 may perform these operations and/or processes in response to system control module 210 executing sequences of instructions contained in a computer-readable medium. For example, software instructions may be read into a memory from another computer-readable medium or from another device via interfaces 230. The software instructions contained in the memory may cause system control module 210 to perform processes that are described herein. Alternatively, hardwired circuitry may be used in place of or in combination with software instructions to implement processes described herein. Thus, implementations described herein are not limited to any specific combination of hardware circuitry and software. The term "computer-readable medium" is intended to be broadly interpreted to include a memory, a secondary storage, a compact disc (CD), a digital versatile disc (DVD), or the like. The computer-readable medium may be implemented in a single device, in multiple devices, in a centralized manner, or in a distributed manner. The computer-readable medium may include a physical memory device or a logical memory device. A logical memory device may include memory space within a single physical memory device or spread across multiple physical memory devices.

Although, FIG. 2 illustrates exemplary components of network device 105, in other implementations, network device 105 may include additional, fewer, different, or differently arranged components than those illustrated in FIG. 2 and described herein. Additionally, or alternatively, one or more operations described as being performed by a particular component of network device 105 may be performed by one or more other components, in addition to or instead of the particular component.

Exemplary Line Interface Architecture

Figure 3A:
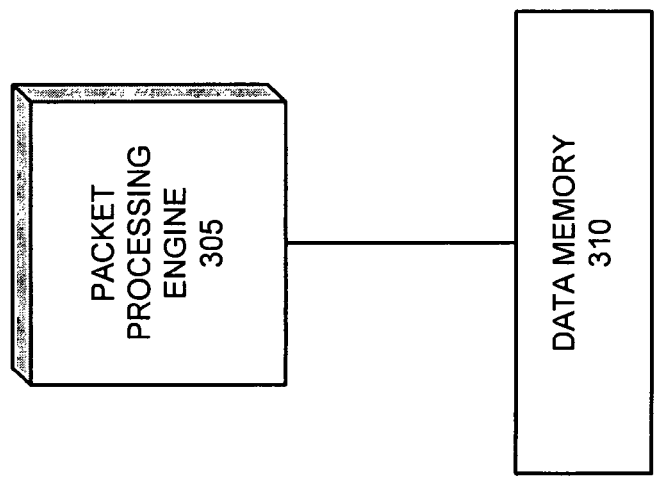
FIG. 3A is a diagram illustrating exemplary functional components of a line interface depicted in FIG. 2.

FIG. 3A is a diagram illustrating exemplary functional components of line interfaces 230. The functional components illustrated in FIG. 3A may be implemented by hardware (e.g., one or more processors or other processing logic, one or more memories) or a combination of hardware and software. As illustrated, line interfaces 230 may include a packet processing engine (PPE) 305 and a data memory 310.

PPE 305 may provide for input, route lookup, and output processing of packets. PPE 305 may consult data memory 310 to perform routing lookups, classification of packets (e.g., for security purposes), policy-based routing, quality of service (QoS) routing, filtering of packets, and other forms of packet processing (e.g., packet statistical processing, accounting, and/or encapsulation). PPE 305 may perform one or more packet processing operations (e.g., packet parsing, route lookup, packet rewriting, nexthop determinations, K-Tree determinations, and/or firewall determinations) based on, for example, microinstructions. The microinstructions may be generated by compiling source code for an application or part of an operation system (OS), such as, for example, Juniper Operating System (JUNOS), Cisco Internet Operating System (IOS), and the like. PPE 305 may execute the microinstructions in one or more processes or threads.

Data memory 310 may store various types of data related to packet processing. For example, data memory 310 may store a forwarding information base (FIB), a K-tree (e.g., a binary tree for route lookup), hash table data structures, counters, routing policies, and instruction sets (e.g., nexthop instruction sets, K-tree instruction sets, etc.). In one implementation, data memory 310 may include WRR table 120.

Although FIG. 3A illustrates exemplary functional components of line interface 230, in other implementations, line interfaces 230 may include fewer, additional, different, and/or differently arranged functional components than those depicted in FIG. 3A. In still other implementations, one or more functional components of line interfaces 230 may perform one or more other tasks described as being performed by one or more other functional components of line interfaces 230. Additionally, PPE 305 and/or data memory 310 may be implemented in one or more components of network device 105, other than line interfaces 230.

Exemplary WRR Scheduling Architecture

As previously described, network device 105 may process packets based on a WRR scheme. For example, network device 105 may include a WRR scheduler 110. WRR scheduler 110 may process packets stored in queues 115 according to queues' 115 corresponding WRR weights. The WRR weights may be stored in WRR table 120. WRR weight calculator 135 may calculate the WRR weights and store them in WRR weight field 130. Provided below is a description of an exemplary WRR scheduling architecture in which the WRR scheduling scheme described herein may be implemented.

Figure 3B:
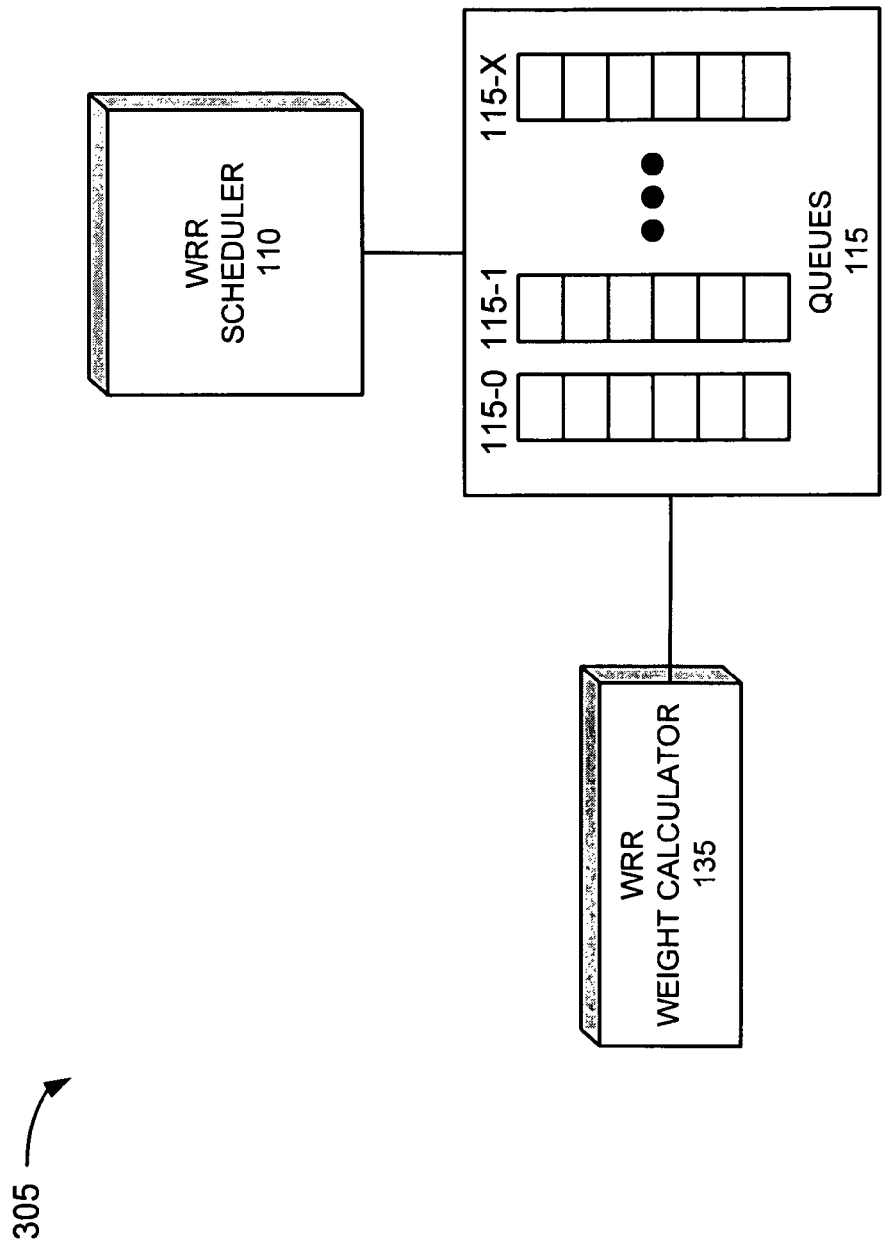
FIG. 3B is a diagram illustrating exemplary components of a packet processing engine (PPE) depicted in FIG. 3A.

FIG. 3B illustrates exemplary components of PPE 305. As illustrated, PPE 305 may include WRR scheduler 110, queues 115, and WRR weight calculator 135.

WRR scheduler 110 may include hardware components, or a combination of hardware components and software components, which may manage the processing of packets based on WRR selection policies. In some implementations, WRR scheduler 110 may monitor the activity or inactivity of queues 115. WRR scheduler 110 may select queues 115 for the processing of packets based on WRR table 120. As described herein, WRR table 120 may include WRR weights associated with queues 115. WRR scheduler 110 may allot timeslots for processing packets associated with a particular queue 115 based on a particular WWR weight with which the particular queue 115 is associated.

Queues 115 may include one or more memories to store packets as processing decisions (e.g., forwarding decisions) are made by network device 105. Queues 115 may correspond to, for example, receiver-side buffers and/or transmitter-side buffers. As illustrated, queues 115 may include queues 115-0 through 115-X (where X>1).

WRR weight calculator 135 may include hardware components, or a combination of hardware components and software components, which may calculate WRR weights. WRR weight calculator 135 may calculate WRR weights based on information, such as, for example, bandwidth available with respect to line interfaces 230, the type of network traffic (e.g., voice, data, real-time data, non-real-time data, etc.) serviced by network device 105, priority preferences with respect to the type of network traffic, the size of the buffers with which queues 115 may be associated, and/or other types of network-based information (e.g., latency parameters, delay parameters, jitter parameters, Quality of Service (QoS) parameters, etc.).

In one implementation, WRR weight calculator 135 may calculate WRR weights based on determining a HCF among the WRR weights. For example, WRR weight calculator 135 may calculate pseudo-intermediary WRR weights for queues 115 and determine whether a HCF exists among these pseudo-intermediary WRR weights. If the HCF exists, WRR weight calculator 135 may reduce each pseudo-intermediary WRR weight according to the determined HCF. In an exemplary case, assume that WRR weight calculator 135 calculates pseudo-intermediary WRR weights of 20, 30, and 50 for queues 115-0, 115-1, and 115-2. In such an instance, WRR weight calculator 135 may calculate a HCF of 10 and calculate WRR weights of 2, 3, and 5 based on the HCF of 10.

In another implementation, WRR weight calculator 135 may calculate WRR weights based on a scaling of the WRR weight ratios. In one implementation, WRR weight calculator 135 may receive an error range with which the ratios between the WRR weights may fall. In another implementation, WRR weight calculator 135 may receive an error threshold with which the ratios between the WRR weights may not exceed. The error range and/or the error threshold may correspond to a measure(s) of tolerance with respect to various network parameters (e.g., latency, overflow, etc.).

In an exemplary case, assume that WRR weight calculator 135 calculates pseudo-intermediary WRR weights of 7, 15, and 30 for queues 115-0, 115-1, and 115-2. In such an instance, WRR weight calculator 135 may not determine a HCF. However, in one implementation, WRR weight calculator 135 may scale the WRR weights (and ratios) between 7, 15, and 30, based on the error range. In other words, WRR weight calculator 135 may calculate an approximate HCF (e.g., 7). For example, assume that the error range corresponds to values of 0.001-0.3. In such a case, WRR weight calculator 135 may modify the pseudo intermediary WRR weights to 1, 2, and 4 since the error values associated with the scaling of the WRR weights fall within the error range. Alternatively, in another implementation, WRR weight calculator 135 may scale the WRR weights (and ratios) between 7, 15, and 30, based on the error threshold. For example, assume that the error threshold corresponds to 0.3. In such instances, WRR weight calculator 135 may modify the pseudo intermediary WRR weights to 1, 2, and 4.

It will be appreciated, in other implementations, that the calculation of WRR weights may be performed without calculating intermediary WRR weights.

Although FIG. 3B illustrates exemplary components of PPE 305, in other implementations, PPE 305 may include additional, fewer, different, and/or differently arranged components than those illustrated in FIG. 3B and described. For example, in other implementations, PPE 305 may not include WRR scheduler 110, queues 115, and/or WRR weight calculator 135. Rather, one or more of these components may reside elsewhere in network device 105. Additionally, or alternatively, one or more operations described as being performed by a particular component may be performed by one or more other components, in addition to or instead of the particular component.

Figure 3C:
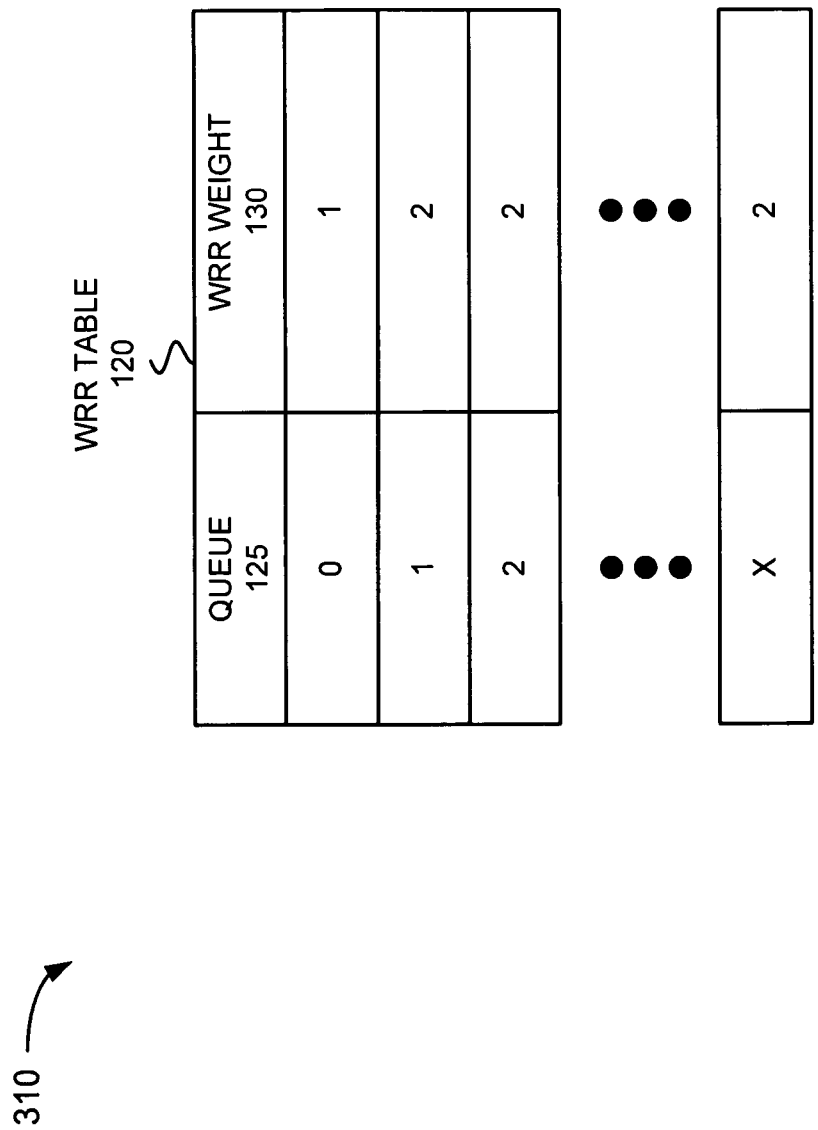
FIG. 3C is a diagram illustrating an exemplary WRR table.

FIG. 3C is a diagram illustrating exemplary data of data memory 310. As illustrated, data memory 310 may include WRR table 120.

WRR table 120 may store a particular WRR weight in correspondence to a particular queue 115. For example, as previously described, WRR table 120 may include queue field 125, which may indicate a particular queue, and WRR weight field 130, which may indicate a particular WRR weight. As illustrated, queue field 125 may indicate values or identifiers for queues 115-0 through 115-X, and WRR weight field 130 may indicate WRR weight values corresponding to queues 115-0 through 115-X.

Although FIG. 3C illustrates an exemplary WRR table 120, in other implementations, WRR table 120 may include additional, different, or fewer data fields than those illustrated in FIG. 3C and described. Additionally, or alternatively, in other implementations, data memory 310 may not include WRR table 120. Rather, WRR table 120 may reside elsewhere in network device 105.

Figure 3D:
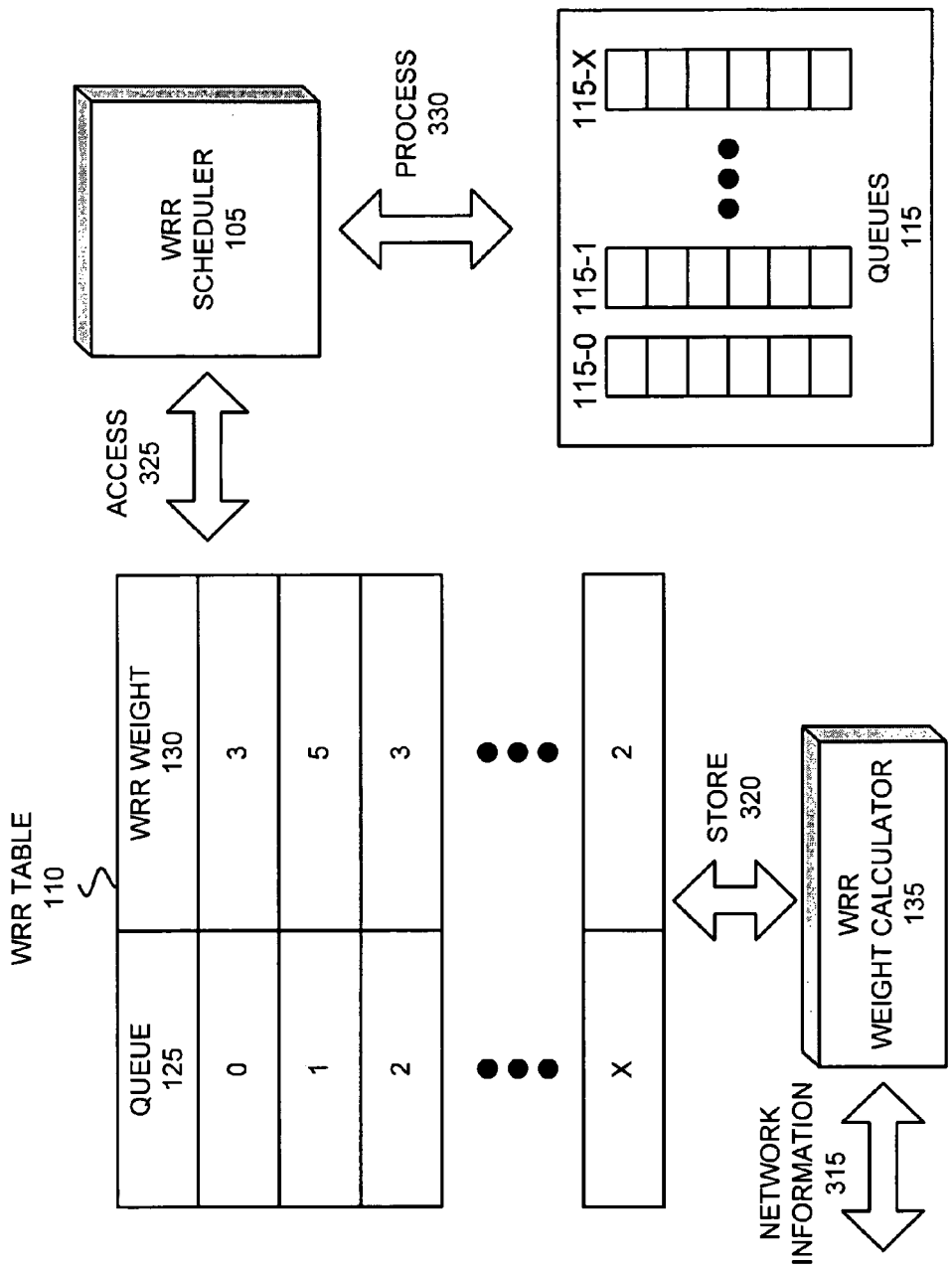
FIG. 3D is a diagram illustrating exemplary operations associated with an exemplary WRR scheduling architecture.

FIG. 3D is a diagram illustrating exemplary operations associated with the exemplary WRR scheduling architecture. As illustrated, WRR weight calculator 135 may receive network information 315. As previously described, network information 315 may include, for example, bandwidth available with respect to line interfaces 230, etc. WRR weight calculator 135 may calculate WRR weights for queues 115 based on the received network information 315, as previously described. WRR weight calculator 135 may reduce the calculated WRR weights based on an HCF or an approximate HCF, as described herein. Once the reduced WRR weights are calculated, WRR weight calculator 135 may store 320 the reduced WRR weights in WRR weight field 130 of WRR table 110.

WRR scheduler 105 may access 325 information from WRR table 110 (e.g., contained in queue field 125 and/or WRR weight field 130), and may process 330 packets associated with queues 115 based on the reduced WRR weights indicated in WRR weight field 130. For example, packets associated with receive buffers may be sent via switch fabric 220 to transmit buffers.

Exemplary Process

Figure 4:
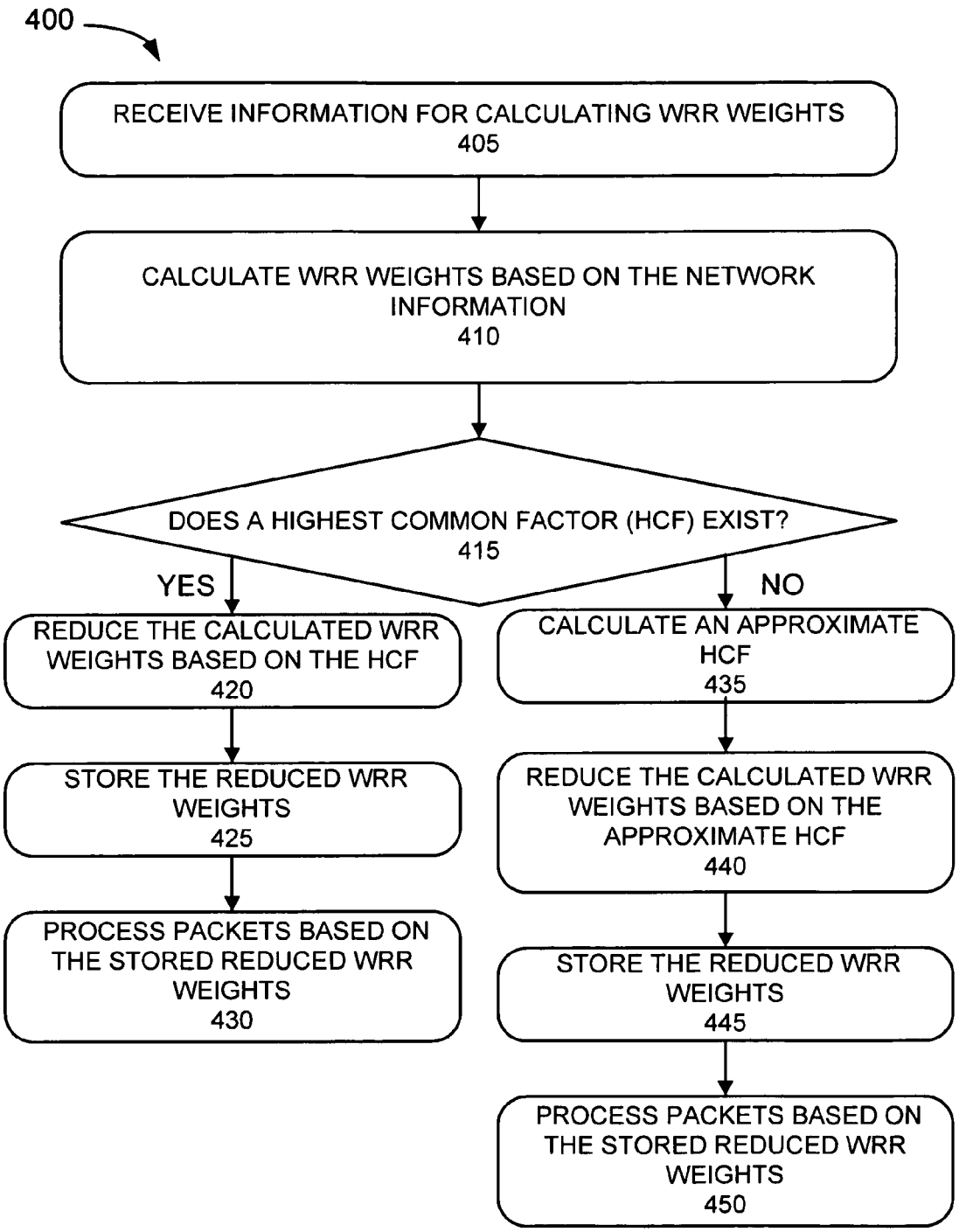
FIG. 4 is a flow diagram illustrating an exemplary process for operating in pass through mode when a crash occurs.

FIG. 4 is a diagram illustrating an exemplary process 400 for calculating WRR weights and utilizing the WRR weights for packet processing. Process 400 may be performed by one or more components of network device 105. For example, the WRR scheduling architecture of network device 105, as illustrated in FIGS. 3B-3D, and described herein, may perform one or more of the operations associated with process 400.

Process 400 may begin with receiving network information for calculating WRR weights (block 405). For example, WRR weight calculator 135 may receive network information from a network administrator. The network information may include, for example, bandwidth available with respect to line interfaces 230, the type of network traffic (e.g., voice, data, real-time data, non-real-time data, etc.) serviced by network device 105, priority preferences with respect to the type of network traffic, the size of the buffers with which queues 115 may be associated, and/or other types of network-based information (e.g., latency parameters, delay parameters, jitter parameters, QoS parameters, etc.).

The WRR weights may be calculated based on the network information (block 410). For example, as described above in connection with FIG. 3D, WRR weight calculator 135 may calculate WRR weights based on network information 315.

It may be determined whether a HCF exists (block 415). For example, WRR weight calculator 135 may determine whether a HCF exists with respect to the calculated WRR weights. WRR weight calculator 135 may utilize any conventional approach for determining whether a HCF exists with respect to a plurality of values or numbers (i.e., WRR weight values).

If it is determined that a HCF exists (block 415—YES), the calculated WRR weights may be reduced based on the HCF (block 420). For example, WRR weight calculator 135 may reduce the calculated WRR weights in accordance with the determined HCF.

The reduced WRR weights may be stored (block 425). For example, WRR weight calculator 135 may store 320 the reduced WRR weights in WRR table 120, as shown in FIG. 3D.

Packets may be processed based on the stored reduced WRR weights (block 430). For example, as shown in FIG. 3D, WRR scheduler 110 may schedule the processing of packets, as indicated by reference number 330, stored in queues 115 in accordance with the reduced WRR weights stored in WRR table 120.

If it is determined that a HCF does not exist (block 415—NO), an approximate HCF may be calculated (block 435). For example, WRR weight calculator 135 may utilize any conventional approach for calculating an approximate HCF with respect to a plurality of values or numbers (i.e., WRR weight values). WRR weight calculator 135 may calculate one or more approximate HCFs that yield minimal error. As previously described, WRR weight calculator 135 may determine whether the error(s) associated with the one or more approximate HCF(s) fall within the error range or does not exceed the error threshold. For purposes of discussion, process 400 will be described as if at least one of the errors fall within the error range or does not exceed the error threshold.

The calculated WRR weights may be reduced based on the approximate HCF (block 440). For example, WRR weight calculator 135 may reduce the calculated WRR weights in accordance with the approximate HCF.

The reduced WRR weights may be stored (block 445). For example, WRR weight calculator 135 may store the reduced WRR weights in WRR table 120.

Packets may be processed based on the stored reduced WRR weights (block 450). For example, WRR scheduler 110 may schedule the processing of packets stored in queues 115 in accordance with the reduced WRR weights stored in WRR table 120.

Although FIG. 4 illustrates an exemplary process 400, in other implementations, additional, fewer, and/or different operations than those described, may be performed. For example, in the instance that a HCF does not exist and an approximate HCF does not yield an error within the error range or the error threshold, WRR calculator 135 may utilize the WRR weights calculated in block 410.

CONCLUSION

The foregoing description of implementations provides an illustration, but is not intended to be exhaustive or to limit the implementations to the precise form disclosed. Modifications and variations are possible in light of the above teachings or may be acquired from practice of the teachings. For example, although the foregoing description has described determining a HCF or an approximate HCF to reduce the WRR weights, while maintaining a proportionality (or an approximate proportionality below an error threshold or within an error range) between the WRR weights, in other implementations, other mathematically-based methods, not specifically described herein, may be utilized to reduce the WRR weights, while maintaining the proportionality (or an approximate proportionality below an error threshold or within an error range) between the WRR weights. Additionally, WRR weights may be re-calculated when, for example, there is a change to a network port bandwidth (e.g., a new queue is configured and/or a bandwidth allocation changes for one or more queues).

In addition, while a series of blocks has been described with regard to the process illustrated in FIG. 4, the order of the blocks may be modified in other implementations. Further, non-dependent blocks may be performed in parallel.

Also, certain aspects have been described as being implemented as "logic" or a "component" that performs one or more functions. This logic or component may include hardware, such as a processor, microprocessor, an ASIC, or a FPGA, or a combination of hardware and software, such as a processor/microprocessor executing instructions stored on a computer-readable medium.

It will be apparent that aspects described herein may be implemented in many different forms of software, firmware, and hardware in the implementations illustrated in the figures. The actual software code or specialized control hardware used to implement aspects does not limit the embodiments. Thus, the operation and behavior of the aspects were described without reference to the specific software code—it being understood that software and control hardware can be designed to implement the aspects based on the description herein.

The term "may" is used throughout this application and is intended to be interpreted, for example, as "having the potential to," "configured to," or "being able," and not in a mandatory sense (e.g., as "must"). The terms "a," "an," and "the" are intended to be interpreted to include one or more items. Where only one item is intended, the term "one" or similar language (e.g., "single") is used. Further, the phrase "based on" is intended to be interpreted as "based, at least in part, on," unless explicitly stated otherwise. The term "and/or" is intended to be interpreted to include any and all combinations of one or more of the associated list items.

Even though particular combination of features are recited in the claims and/or disclosed in the specification, these combinations are not intended to limit the disclosure of the invention. In fact, many of these features may be combined in ways not specifically recited in the claims and/or disclosed in the specification.

No element, block, or instruction used in the present application should be construed as critical or essential to the implementations described herein unless explicitly described as such.

What is claimed is:

1. A method comprising:
receiving, by a network device, network information for calculating weighted round-robin (WRR) weights;
calculating, by the network device, WRR weights associated with queues based on the network information;
determining, by the network device, that a highest common factor (HCF) does not exist in relation to the WRR weights;
calculating an approximate HCF when it is determined that the HCF does not exist;
reducing, by the network device, the WRR weights in accordance with the approximate HCF;
determining whether reducing the WRR weights, in accordance with the approximate HCF, results in values that do not exceed an error threshold or results in values within an error range; and
performing, by the network device, a WRR scheduling of packets stored in the queues based on the reduced WRR weights.

2. The method of claim 1, where the network device corresponds to a switch or a router.

3. The method of claim 1, where, if reducing the WRR weights in accordance with the approximate HCF results in values that do not exceed an error threshold, then the method further comprises:
reducing the WRR weights in accordance with the approximate HCF; and
comparing values associated with the WRR weights, reduced by the approximate HCF, with the error threshold or with the error range.

4. The method of claim 1, where the network information includes at least one of an available bandwidth and a type of network traffic.

5. The method of claim 1, further comprising:
storing the reduced WRR weights in a WRR table that identifies the queues.

6. A network device, comprising:
a weighted round-robin (WRR) weight calculator to:
calculate WRR weights based on at least one of available bandwidth or type of network traffic;
determine that a highest common factor (HFC) does not exist in relation to the WRR weights;
calculate an approximate HCF when it is determined that the HCF does not exist;
reduce the WRR weights in accordance with the approximate HCF;
determine whether reducing the WRR weights in accordance with the approximate HCF results in values that do not exceed an error threshold or results in values within an error range; and
store the reduced WRR weights; and
a WRR scheduler to:
schedule the processing of packets, stored in queues, based on the reduced WRR weights.

7. The network device of claim 6, further comprising:
a WRR table that identifies the queues, and where the WWR weight calculator further is to store the reduced WRR weights in the WRR table.

8. The network device of claim 6, where the network device includes one of a router or a switch.

9. The network device of claim 6, further comprising:
a packet processing engine to process the packets stored in the queues.

10. The device of claim 6, where, when the WWR weight calculator is to store the reduced weights, the WWR weight calculator is to store the reduced weights in a WRR table that identifies the queues.

11. A network device, comprising:
at least one processor to:
  calculate weighted round-robin (WRR) weights;
  determine whether a highest common factor (HCF) exists in relation to the WRR weights;
  calculate an approximate HCF when it is determined that the HCF does not exist,
  reduce the WRR weights in accordance with the HCF;
  store the reduced WRR weights in a WWR table that identifies queues associated with processing of packets; and
  schedule the processing of the packets, associated with the queues, based on the stored WRR weights,
where the processor, when reducing the WRR weights, is further to:
  compare values associated with the WRR weights, if reduced in accordance with the approximate HCF, with an error threshold or with an error range,
  determine if the WRR weights, if reduced in accordance with the approximate HCF, fall within the error range or do not exceed the error threshold, and
  reduce the WRR weights, in accordance with the approximate HCF, when it is determined that the WRR weights, if reduced in accordance with the approximate HCF, fall within the error range or do not exceed the error threshold.

12. The network device of claim 11, where the network device comprises a switch or a router.

* * * * *